(12) United States Patent
Tang et al.

(10) Patent No.: US 11,232,563 B1
(45) Date of Patent: Jan. 25, 2022

(54) CROP YIELD PREDICTION METHOD AND DEVICE BASED ON MULTI-LEVEL VARIABLE ANALYSIS

(71) Applicant: Guangdong Polytechnic Normal University, Guangzhou (CN)

(72) Inventors: Yu Tang, Guangzhou (CN); Huasheng Huang, Guangzhou (CN); Shaoming Luo, Guangzhou (CN); Qiwei Guo, Guangzhou (CN); Xincai Zhuang, Guangzhou (CN); Jiahao Li, Guangzhou (CN); Jiepeng Yang, Guangzhou (CN); Chaojun Hou, Guangzhou (CN); Jiajun Zhuang, Guangzhou (CN); Aimin Miao, Guangzhou (CN); Xuan Chu, Guangzhou (CN)

(73) Assignee: Guangdong Polytechnic Normal University, Guangzhou (CN)

( * ) Notice: Subject to any disclaimer, the term of this patent is extended or adjusted under 35 U.S.C. 154(b) by 0 days.

(21) Appl. No.: 17/191,511

(22) Filed: Mar. 3, 2021

(30) Foreign Application Priority Data

Jul. 6, 2020 (CN) .......................... 202010640967.1

(51) Int. Cl.
*G06T 7/00* (2017.01)
*G06T 7/12* (2017.01)

(52) U.S. Cl.
CPC .. *G06T 7/0012* (2013.01); *G06T 2207/10032* (2013.01); *G06T 2207/20081* (2013.01); *G06T 2207/20084* (2013.01); *G06T 2207/30004* (2013.01); *G06T 2207/30188* (2013.01); *G06T 2207/30252* (2013.01)

(58) Field of Classification Search
CPC . G06T 2207/10032; G06T 2207/20081; G06T 2207/20084; G06T 2207/30004; G06T 2207/30188; G06T 2207/30252
See application file for complete search history.

(56) References Cited

U.S. PATENT DOCUMENTS

| | | | |
|---|---|---|---|
| 2014/0311014 A1* | 10/2014 | Feugier | A01M 1/226 43/107 |
| 2019/0050948 A1* | 2/2019 | Perry | G06Q 10/04 |

\* cited by examiner

*Primary Examiner* — Dakshesh D Parikh
(74) *Attorney, Agent, or Firm* — Getech Law LLC; Jun Ye

(57) ABSTRACT

Disclosed is a crop yield prediction method and device. The method includes: transmitting an image acquisition instruction to a preset aircraft terminal to acquire a ground image; transmitting a driving instruction at the same time, wherein a distance between a first rail vehicle and a second rail vehicle is inversely proportional to the driving time, a plurality of light channels are embedded between a first rail and a second rail, and a light transmittance of the light channels is able to be affected by the external environment to change; transmitting a light emitting instruction and recording initial data when multiple beams of light are emitted; transmitting a light receiving instruction and recording final data when the multiple beams of light are received; and inputting the ground image, the initial data and the final data into a crop yield prediction model for processing.

6 Claims, 2 Drawing Sheets

S1: transmitting an image acquisition instruction to a preset aircraft terminal to make the aircraft terminal control a preset image acquisition device on a preset aircraft to perform image acquisition processing on a specified ground to acquire a ground image, wherein crops are planted on the specified ground in advance S2: transmitting a driving instruction to a first rail vehicle terminal and a second rail vehicle terminal which are preset under the specified ground at the same time to make the first rail vehicle terminal control a first rail vehicle to move forward along a preset first rail and make the second rail vehicle terminal control a second rail vehicle to move forward along a preset second rail, wherein both the first rail vehicle and the second rail vehicle drive toward a first direction, a connecting line between a starting point of the first rail vehicle and a starting point of the second rail vehicle is vertical to the first direction, a distance between the first rail vehicle and the second rail vehicle is inversely proportional to the driving time, the first rail and the second rail are located in the same height position, a plurality of light channels are embedded between the first rail and the second rail, and a light transmittance of the light channels is able to be affected by the external environment to change S3: transmitting a light emitting instruction to the first rail vehicle terminal to make the first rail vehicle terminal control a preset light generation device on the first rail vehicle to transmit multiple beams of light to the second rail vehicle respectively through the plurality of light channels, and recording initial data when the multiple beams of light are emitted S4: transmitting a light receiving instruction to the second rail vehicle terminal to make the second rail vehicle terminal control a preset light sensor on the second rail vehicle to acquire the multiple beams of light which are from the first rail vehicle and pass through the plurality of light channels respectively, and recording final data when the multiple beams of light are received S5: acquiring the initial data when the multiple beams of light transmitted by the first rail vehicle terminal and the second rail vehicle terminal respectively are emitted, and the final data when the multiple beams of light are received S6: inputting the initial data when the ground image and the multiple beams of light are emitted, and the final data when the multiple beams of light are received into a preset crop yield prediction model for processing so as to acquire a predicted yield output by the crop yield prediction model, wherein the crop yield prediction model is trained by training data based on a neural network model, the training data being composed of a ground picture of an area with a known yield, light data emitted by the light generation device on the first rail vehicle in the area and light data received by the light sensor on the second rail vehicle in the area

FIG. 1

CROP YIELD PREDICTION METHOD AND DEVICE BASED ON MULTI-LEVEL VARIABLE ANALYSIS

TECHNICAL FIELD

The present application relates to the field of computers, and in particular, to a crop yield prediction method and device based on a multi-level variable analysis, a computer device and a storage medium.

BACKGROUND

Rapid and accurate crop yield prediction is of great significance. At present, the traditional crop yield prediction is generally implemented by performing high-altitude image acquisition on the ground where crops are planted and then analyzing the acquired image so as to predict the crop yield. However, the traditional crop yield prediction method is actually performed only based on the growth state of the crops on the surface, so the prediction accuracy is low.

SUMMARY

The present application provides a crop yield prediction method based on a multi-level variable analysis. The method, applied to a control terminal, includes:

S1: transmitting an image acquisition instruction to a preset aircraft terminal to make the aircraft terminal control a preset image acquisition device on a preset aircraft to perform image acquisition processing on a specified ground to acquire a ground image, wherein crops are planted on the specified ground in advance;

S2: transmitting a driving instruction to a first rail vehicle terminal and a second rail vehicle terminal which are preset under the specified ground at the same time to make the first rail vehicle terminal control a first rail vehicle to move forward along a preset first rail and make the second rail vehicle terminal control a second rail vehicle to move forward along a preset second rail, wherein both the first rail vehicle and the second rail vehicle drive toward a first direction, a connecting line between a starting point of the first rail vehicle and a starting point of the second rail vehicle is vertical to the first direction, a distance between the first rail vehicle and the second rail vehicle is inversely proportional to the driving time, the first rail and the second rail are located in the same height position, a plurality of light channels are embedded between the first rail and the second rail, and a light transmittance of the light channels is able to be affected by the external environment to change;

S3: transmitting a light emitting instruction to the first rail vehicle terminal to make the first rail vehicle terminal control a preset light generation device on the first rail vehicle to transmit multiple beams of light to the second rail vehicle respectively through the plurality of light channels, and recording initial data when the multiple beams of light are emitted;

S4: transmitting a light receiving instruction to the second rail vehicle terminal to make the second rail vehicle terminal control a preset light sensor on the second rail vehicle to acquire the multiple beams of light which are from the first rail vehicle and pass through the plurality of light channels respectively, and recording final data when the multiple beams of light are received;

S5: acquiring the initial data when the multiple beams of light transmitted by the first rail vehicle terminal and the second rail vehicle terminal respectively are emitted, and the final data when the multiple beams of light are received; and S6: inputting the initial data when the ground image and the multiple beams of light are emitted, and the final data when the multiple beams of light are received into a preset crop yield prediction model for processing so as to acquire a predicted yield output by the crop yield prediction model, wherein the crop yield prediction model is trained by training data based on a neural network model, the training data being composed of a ground picture of an area with a known yield, light data emitted by the light generation device on the first rail vehicle in the area and light data received by the light sensor on the second rail vehicle in the area.

Further, the aircraft is an unmanned aerial vehicle and a satellite; the step S1: transmitting an image acquisition instruction to a preset aircraft terminal to make the aircraft terminal control a preset image acquisition device on a preset aircraft to perform image acquisition processing on a specified ground to acquire a ground image includes:

S101: transmitting a first image acquisition instruction to an unmanned aerial vehicle terminal to make the unmanned aerial vehicle terminal control a preset image acquisition device on an unmanned aerial vehicle to perform image acquisition processing on a specified ground to acquire a first ground image, and S102: transmitting an image acquisition instruction to a satellite terminal to make the satellite terminal control a preset image acquisition device on the satellite to perform image acquisition processing on a specified ground to acquire a second ground image;

the crop yield prediction model is composed of a first neural network architecture, a second neural network architecture and a third neural network architecture, the first neural network architecture being connected to the second neural network architecture in parallel, and the first neural network architecture and the second neural network architecture being respectively connected to the third neural network architecture in series; the first neural network architecture is composed of a first convolutional neural network structure, a second convolutional neural network structure and a BP neural network structure, the first convolutional neural network structure being connected to the second convolutional neural network structure in parallel, and the first convolutional neural network structure and the second convolutional neural network structure being respectively connected to the BP neural network structure in series; and the step S6: inputting the initial data when the ground image and the multiple beams of light are emitted, and the final data when the multiple beams of light are received into a preset crop yield prediction model for processing so as to acquire a predicted yield output by the crop yield prediction model includes:

S601: inputting the first ground image into the first convolutional neural network structure so as to utilize a convolutional layer, a pooling layer and a full connection layer in the first convolutional neural network structure to process the first ground image into a first one-dimensional feature vector, S602: inputting the second ground image into the second convolutional neural network structure so as to utilize a convolutional layer, a pooling layer and a full connection layer in the second convolutional neural network structure to process the second ground image into a second one-dimensional feature vector, S603: generating a two-dimensional relation matrix according to the first one-dimensional feature vector and the second one-dimensional feature vector, S604: performing matrix dimension transformation and feature screening processing on the two-dimensional relation matrix and inputting into the BP neural network structure so as to acquire a first prediction yield output by the BP neural network structure, S605: inputting the initial data when the multiple beams of light are emitted, and the final data when the multiple beams of light are received into the second neural network architecture so as to acquire a second prediction yield output by the second neural network architecture, and S606: inputting the first prediction yield and the second prediction yield into the third neural network architecture so as to acquire a final prediction yield output by the third neural network architecture according to weight allocation.

Further, a main body of each of the light channels is a glass pipe, the glass pipe being provided with a plurality of cavities and a plurality of capillary pores, the capillary pores being located between the cavities and soil, each of the cavities being filled with a solid PH value indicating material, and the solid PH value indicating material showing a first color in a preset acidic environment and showing other colors in other environments; and the step S3: transmitting a light emitting instruction to the first rail vehicle terminal to make the first rail vehicle terminal control a preset light generation device on the first rail vehicle to transmit multiple beams of light to the second rail vehicle respectively through the plurality of light channels, and recording initial data when the multiple beams of light are emitted includes:

S301: transmitting a light emitting instruction to the first rail vehicle terminal to make the first rail vehicle terminal control a preset light generation device on the first rail vehicle to transmit multiple beams of light to the second rail vehicle respectively through the plurality of light channels, and recording initial data when the multiple beams of light are emitted; and the step S4: transmitting a light receiving instruction to the second rail vehicle terminal to make the second rail vehicle terminal control a preset light sensor on the second rail vehicle to acquire the multiple beams of light which are from the first rail vehicle and pass through the plurality of light channels respectively, and recording final data when the multiple beams of light are received comprises:

S401: transmitting a light receiving instruction to the second rail vehicle terminal to make the second rail vehicle terminal control a preset light sensor on the second rail vehicle to acquire the multiple beams of light which are from the first rail vehicle and pass through the plurality of light channels respectively, the light sensor being a sensor which is only able to sense visible light with the first color, and recording final data when the multiple beams of light are received.

Further, n rails are preset under the specified ground, the first rail is only provided with a No. 1 rail vehicle, all the rails except the first rail are provided with a No. 1 rail vehicle and a NO. 2 rail vehicle, the No. 1 rail vehicle being provided with a light generation device, and the No. 2 rail vehicle being provided with a light sensor; all the rail vehicles only can drive toward a first direction, and a connecting line of starting points of all the rail vehicles is vertical to the first direction; if the vehicles on the rails drive at the same speed, a distance of the vehicle on any one of the rails and the vehicle on the other rail is inversely proportional to the driving time; all the rails are located at the same height position; a plurality of light channels are embedded between the adjacent rails, a light transmittance of the light channels is able to be affected by the external environment to change, n being an integer greater than 2; and the step S6: inputting the initial data when the ground image and the multiple beams of light are emitted, and the final data when the multiple beams of light are received into a preset crop yield prediction model for processing so as to acquire a predicted yield output by the crop yield prediction model includes:

S611: transmitting an starting instruction to terminals corresponding to all the rail vehicles to make all the rail vehicles drive along the corresponding rails and make the No. 1 rail vehicles emit multiple beams of light showing first color to the No. 2 rail vehicles on the next rail respectively through the plurality of light channels, such that the No. 2 rail vehicle are able to sense a signal through a light sensor, wherein parameters of light emitted by each of the No. 1 rail vehicles are unchanged, but parameters of light emitted by the No. 1 rail vehicles on different rails are different, S612: transmitting a vehicle stop instruction to terminals corresponding to all the No. 2 rail vehicles to ask the No. 2 rail vehicles meeting a specified requirement to stop, wherein the specified requirement refers to that when the No. 2 rail vehicles detect that a signal intensity is greater than a preset intensity threshold, the No. 2 rail vehicles with the detected signal intensity greater than the preset intensity threshold meet the requirements, S613: acquiring locating positions of all the No. 2 rail vehicles when all the No. 2 rail vehicles stop so as to generate a site map according to the locating positions of all the No. 2 rail vehicle, and S614: inputting the ground image and the site map into a preset crop yield prediction model for processing so as to acquire a predicted yield output by the crop yield prediction model.

Further, the crop yield prediction model is trained based on a single convolutional neural network model; and before the step S604: inputting the ground image and the site map into a preset crop yield prediction model for processing so as to acquire a predicted yield output by the crop yield prediction model, the method includes:

S6031: acquiring a plurality of sample sets of a pre-collection set, wherein each of the sample sets is composed of a comprehensive image corresponding to a ground planted with crops and a yield label corresponding to the comprehensive image, and the comprehensive image is formed by splicing a ground image for training corresponding to the ground planted with the crops and a site map for training, S6032: dividing the plurality of sample sets into a training set and a verification set and calling a preset single convolutional neural network model, S6033: inputting the training set into the convolutional neural network model for training so as to acquire an intermediate convolutional neural network model, S6034: verifying the intermediate convolutional neural network model by the verification set to acquire a verification result and judging whether the verification result is pass or fail, and S6035: if the verification result is pass, recording the intermediate convolutional neural network model as a crop yield prediction model.

The present application provides a crop yield prediction device based on a multi-level variable analysis. The device, applied to a control terminal, includes: an image acquisition instruction transmitting unit, configured to transmit an image acquisition instruction to a preset aircraft terminal to make the aircraft terminal control a preset image acquisition device on a preset aircraft to perform image acquisition processing on a specified ground to acquire a ground image, wherein crops are planted on the specified ground in advance;

a driving instruction transmitting unit, configured to transmit a driving instruction to a first rail vehicle terminal and a second rail vehicle terminal which are preset under the specified ground at the same time to make the first rail vehicle terminal control a first rail vehicle to move forward along a preset first rail and make the second rail vehicle terminal control a second rail vehicle to move forward along a preset second rail, wherein both the first rail vehicle and the second rail vehicle drive toward a first direction, a connecting line between a starting point of the first rail vehicle and a starting point of the second rail vehicle is vertical to the first direction, a distance between the first rail vehicle and the second rail vehicle is inversely proportional to the driving time, the first rail and the second rail are located in the same height position, a plurality of light channels are embedded between the first rail and the second rail, and a light transmittance of the light channels is able to be affected by the external environment to change;

a light emitting instruction transmitting unit, configured to transmit a light emitting instruction to the first rail vehicle terminal to make the first rail vehicle terminal control a preset light generation device on the first rail vehicle to transmit multiple beams of light to the second rail vehicle respectively through the plurality of light channels, and record initial data when the multiple beams of light are emitted;

a light receiving instruction transmitting unit, configured to transmit a light receiving instruction to the second rail vehicle terminal to make the second rail vehicle terminal control a preset light sensor on the second rail vehicle to acquire the multiple beams of light which are from the first rail vehicle and pass through the plurality of light channels respectively, and record final data when the multiple beams of light are received;

a light data acquisition unit, configured to acquire the initial data when the multiple beams of light transmitted by the first rail vehicle terminal and the second rail vehicle terminal respectively are emitted, and the final data when the multiple beams of light are received; and a predicted yield acquisition unit, configured to input the initial data when the ground image and the multiple beams of light are emitted, and the final data when the multiple beams of light are received into a preset crop yield prediction model for processing so as to acquire a predicted yield output by the crop yield prediction model, wherein the crop yield prediction model is trained by training data based on a neural network model, the training data being composed of a ground picture of an area with a known yield, light data emitted by the light generation device on the first rail vehicle in the area and light data received by the light sensor on the second rail vehicle in the area.

The present application provides a computer device. The computer device includes a memory and a processor, wherein the memory stores a computer program, and the processor implements the steps of any one of the above methods when executing the computer program.

The present application provides a computer readable storage medium. A computer program is stored in the computer readable storage medium and enables the processor to implement the steps of any one of the above methods when being executed by the processor.

According to the crop yield prediction method and device based on the multi-level variable analysis, the computer device and the storage medium of the present application, an image acquisition instruction is transmitted to a preset aircraft terminal to acquire a ground image; a driving instruction is transmitted to a first rail vehicle terminal and a second rail vehicle terminal which are preset under the specified ground at the same time, wherein a distance between the first rail vehicle and the second rail vehicle is inversely proportional to the driving time, a plurality of light channels are embedded between a first rail and a second rail, and a light transmittance of the light channels is able to be affected by the external environment to change; a light emitting instruction is transmitted to the first rail vehicle terminal and initial data when multiple beams of light are emitted is recorded; and the ground image, the initial data when the multiple beams of light are emitted and the final data when the multiple beams of light are received are input into a preset crop yield prediction model for process so as to obtain a predicted yield output by the crop yield prediction model. In the present application, the multi-level at least includes an overground level and an underground level, which respectively correspond to the ground image acquired by the aircraft, the initial data when the multiple beams of light are emitted and the final data when the multiple beams of light are received, such that the crop yield prediction accuracy is improved. In particular, it should be noted that special design is adopted during data acquisition on the underground level, thereby reducing a hash rate consumed in the final data processing process and contributing to improving the overall prediction efficiency.

BRIEF DESCRIPTION OF THE DRAWINGS

FIG. 1 is a schematic flowchart of a crop yield prediction method based on a multi-level variable analysis according to an embodiment of the present application.

Figure 2:
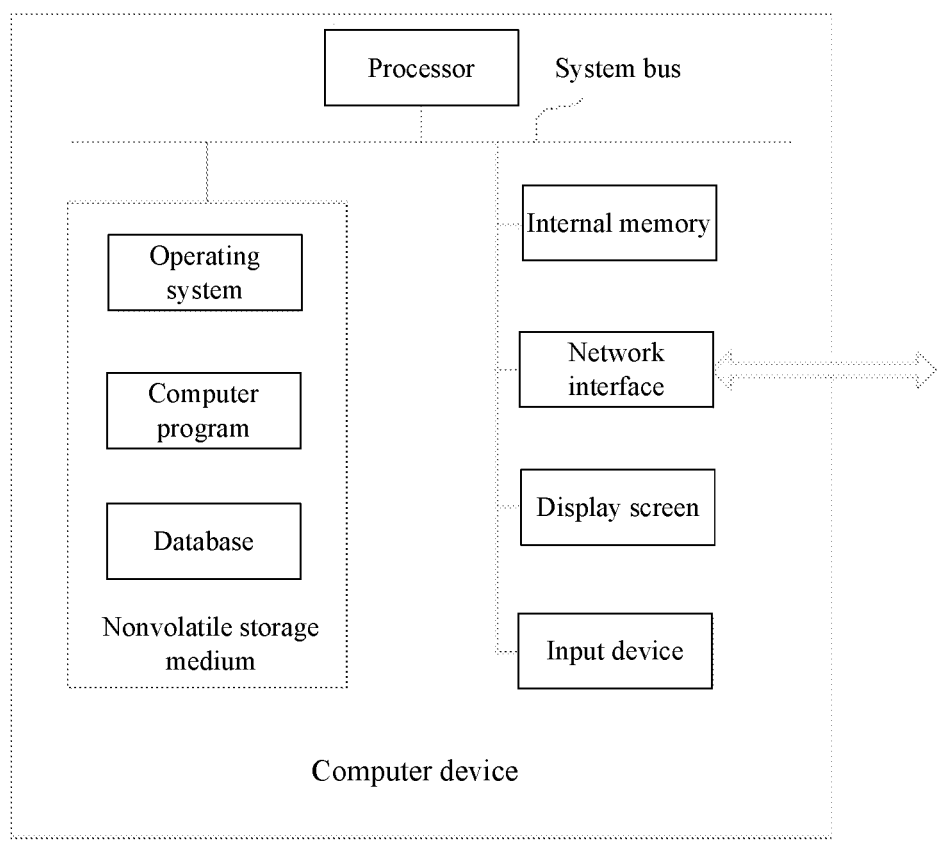
FIG. 2 is a structural schematic block diagram of a computer device according to an embodiment of the present application.

The implementation of objectives, functional characteristics, and advantages of the present application will be further described with reference to the accompanying drawings.

DETAILED DESCRIPTION OF THE EMBODIMENTS

To make the objectives, technical solutions, and advantages of the present application clearer, the present application is further described below in detail with reference to the accompanying drawings and embodiments. It should be understood that the specific embodiments described herein are only for explaining the present application, rather than for limiting the present application.

According to the present application, accurate crop yield prediction is realized through multi-level variable analysis. In the present application, the multi-level at least includes an overground level and an underground level, which respectively correspond to the ground image acquired by the aircraft, the initial data when the multiple beams of light are emitted and the final data when the multiple beams of light are received, such that the crop yield prediction accuracy is improved. In particular, it should be noted that special design is adopted during data acquisition on the underground level, thereby reducing a hash rate consumed in the final data processing process and contributing to improving the overall prediction efficiency.

Referring to FIG. 1, the embodiment of the present application provides a crop yield prediction method based on a multi-level variable analysis. The method, applied to a control terminal, includes:

S1: an image acquisition instruction is transmitted to a preset aircraft terminal to make the aircraft terminal control a preset image acquisition device on a preset aircraft to perform image acquisition processing on a specified ground to acquire a ground image, wherein crops are planted on the specified ground in advance;

S2: a driving instruction is transmitted to a first rail vehicle terminal and a second rail vehicle terminal which are preset under the specified ground at the same time to make the first rail vehicle terminal control a first rail vehicle to move forward along a preset first rail and make the second rail vehicle terminal control a second rail vehicle to move forward along a preset second rail, wherein both the first rail vehicle and the second rail vehicle drive toward a first direction, a connecting line between a starting point of the first rail vehicle and a starting point of the second rail vehicle is vertical to the first direction, a distance between the first rail vehicle and the second rail vehicle is inversely proportional to the driving time, the first rail and the second rail are located in the same height position, a plurality of light channels are embedded between the first rail and the second rail, and a light transmittance of the light channels is able to be affected by the external environment to change;

S3: a light emitting instruction is transmitted to the first rail vehicle terminal to make the first rail vehicle terminal control a preset light generation device on the first rail vehicle to transmit multiple beams of light to the second rail vehicle respectively through the plurality of light channels, and initial data when the multiple beams of light are emitted is recorded;

S4: a light receiving instruction is transmitted to the second rail vehicle terminal to make the second rail vehicle terminal control a preset light sensor on the second rail vehicle to acquire the multiple beams of light which are from the first rail vehicle and pass through the plurality of light channels respectively, and final data when the multiple beams of light are received is recorded;

S5: the initial data when the multiple beams of light transmitted by the first rail vehicle terminal and the second rail vehicle terminal respectively are emitted, and the final data when the multiple beams of light are received are acquired; and S6: the initial data when the ground image and the multiple beams of light are emitted, and the final data when the multiple beams of light are received are input into a preset crop yield prediction model for processing so as to acquire a predicted yield output by the crop yield prediction model, wherein the crop yield prediction model is trained by training data based on a neural network model, the training data being composed of a ground picture of an area with a known yield, light data emitted by the light generation device on the first rail vehicle in the area and light data received by the light sensor on the second rail vehicle in the area.

As described in the step S1, an image acquisition instruction is transmitted to a preset aircraft terminal to make the aircraft terminal control a preset image acquisition device on a preset aircraft to perform image acquisition processing on a specified ground to acquire a ground image, wherein crops are planted on the specified ground in advance. The aircraft may be single type of aircraft or different types of aircraft, and may be a low-altitude aircraft or a high-altitude aircraft. The aircraft terminal controls the preset image acquisition device on the preset aircraft to perform image acquisition processing on the specified ground to acquire the ground image, so the ground image reflects the macroscopic state of the crops on the ground surface and may serve as a basis for yield prediction.

Further, the aircraft is an unmanned aerial vehicle and a satellite. The step S1: an image acquisition instruction is transmitted to a preset aircraft terminal to make the aircraft terminal control a preset image acquisition device on a preset aircraft to perform image acquisition processing on a specified ground to acquire a ground image includes:

S101: a first image acquisition instruction is transmitted to an unmanned aerial vehicle terminal to make the unmanned aerial vehicle terminal control a preset image acquisition device on an unmanned aerial vehicle to perform image acquisition processing on a specified ground to acquire a first ground image, and S102: an image acquisition instruction is transmitted to a satellite terminal to make the satellite terminal control a preset image acquisition device on the satellite to perform image acquisition processing on a specified ground to acquire a second ground image.

Therefore, the acquired ground image actually includes a first ground image and a second ground image, and the first ground image and the second ground image respectively correspond to a low-altitude level and a high-altitude level (relatively speaking), such that the crop yield prediction based on three-level variable analysis is realized.

It should be noted that when the present application adopts the design that the aircraft is the unmanned aerial vehicle and the satellite, the crop yield prediction model has corresponding special design, that is, the crop yield prediction model is composed of a first neural network architecture, a second neural network architecture and a third neural network architecture, the first neural network architecture being connected to the second neural network architecture in parallel, and the first neural network architecture and the second neural network architecture being respectively connected to the third neural network architecture in series; the first neural network architecture is composed of a first convolutional neural network structure, a second convolutional neural network structure and a BP neural network structure, the first convolutional neural network structure being connected to the second convolutional neural network structure in parallel, and the first convolutional neural network structure and the second convolutional neural network structure being respectively connected to the BP neural network structure in series; and the step S6: the initial data when the ground image and the multiple beams of light are emitted, and the final data when the multiple beams of light are received are input into a preset crop yield prediction model for processing so as to acquire a predicted yield output by the crop yield prediction model includes:

S601: the first ground image is input into the first convolutional neural network structure so as to utilize a convolutional layer, a pooling layer and a full connection layer in the first convolutional neural network structure to process the first ground image into a first one-dimensional feature vector, S602: the second ground image is input into the second convolutional neural network structure so as to utilize a convolutional layer, a pooling layer and a full connection layer in the second convolutional neural network structure to process the second ground image into a second one-dimensional feature vector, S603: a two-dimensional relation matrix is generated according to the first one-dimensional feature vector and the second one-dimensional feature vector, S604: the two-dimensional relation matrix is subjected to matrix dimension transformation and feature screening processing and is into the BP neural network structure so as to acquire a first prediction yield output by the BP neural network structure, S605: the initial data when the multiple beams of light are emitted, and the final data when the multiple beams of light are received are input into the second neural network architecture so as to acquire a second prediction yield output by the second neural network architecture, and S606: the first prediction yield and the second prediction yield are input into the third neural network architecture so as to acquire a final prediction yield output by the third neural network architecture according to weight allocation.

Therefore, the crop yield prediction method based on the three-level variable analysis may be implemented. The process of processing the first ground image into the first one-dimensional feature vector is to, for example, download from platforms such as Baidu map, Tencent map and the like according to the specified ground position, and acquire the one-dimensional feature vector by inputting the first ground image into a convolutional network for convolution, pooling and full connection operations. The process of processing the second ground image into the second one-dimensional feature vector is to, for example, acquire an unmanned aerial vehicle image sequence with a specific overlapping ratio for the specified ground, generate a front photographic image of the whole specified ground based on an image mosaic technology, and send the front photographic image into the convolutional layer, the pooling layer and the full connection layer of the convolutional network to acquire the one-dimensional feature vector. The step of generating the two-dimensional relation matrix according to the first one-dimensional feature vector and the second one-dimensional feature vector is, for example, according to a formula: R=S*U T, wherein in the formula, S represents the one-dimensional feature vector of the satellite image, U T represents transposition of the one-dimensional feature vector of the unmanned aerial vehicle image, and R is the two-dimensional relation matrix. Assuming that the satellite image feature S and the unmanned aerial vehicle image feature U are both matrixes of 1*n, the two-dimensional relation matrix R is the matrix of n*n. The matrix dimensional transformation and feature screening processing on the two-dimensional relation matrix may be performed according to the genetic algorithm setting of the BP neural network, which is not elaborated herein.

As described in the step S2, the driving instruction is transmitted to the first rail vehicle terminal and the second rail vehicle terminal which are preset under the specified ground at the same time to make the first rail vehicle terminal control the first rail vehicle to move forward along the preset first rail and make the second rail vehicle terminal control the second rail vehicle to move forward along a preset second rail, wherein both the first rail vehicle and the second rail vehicle drive toward the first direction, the connecting line between the starting point of the first rail vehicle and the starting point of the second rail vehicle is vertical to the first direction, the distance between the first rail vehicle and the second rail vehicle is inversely proportional to the driving time, the first rail and the second rail are located in the same height position, the plurality of light channels are embedded between the first rail and the second rail, and the light transmittance of the light channels is able to be affected by the external environment to change. According to the present application, rails are preset underground for vehicles equipped with light generators and light sensors to pass. The rails may be arranged at a position of 0 to 2 m underground, preferably 0 to 1 m and 0 to 0.5 m. It should be noted that in the present application, the rails and the rail vehicles are specially designed and the special parts are as follows: both the first rail vehicle and the second rail vehicle drive toward the first direction, the connecting line between the starting point of the first rail vehicle and the starting point of the second rail vehicle is vertical to the first direction, the distance between the first rail vehicle and the second rail vehicle is inversely proportional to the driving time, the first rail and the second rail are located in the same height position, the plurality of light channels are embedded between the first rail and the second rail, and the light transmittance of the light channels is able to be affected by the external environment to change. The connecting line between the starting point of the first rail vehicle and the starting point of the second rail vehicle is vertical to the first direction, which indicates that the starting points of the vehicles are parallel to each other. More importantly, the distance between the first rail vehicle and the second rail vehicle is inversely proportional to the driving time, which indicates that the rails are not parallel to each other. The distance between rails decreases as the distance from the starting points increases, which is another characteristic of the present application. The benefit is that the state of soil can be accurately detected without adjusting the light generator, thus omitting the step of adjusting the light generator and improving the overall efficiency. It should be noted that a plurality of light channels are embedded between the first rail and the second rail, and the light transmittance of the light channels is able to be affected by the external environment to change, which is an important design to implement the present application. The principle is that since the light channels are able to be affected by the external environment to change, the state of the soil is able to affect the light transmittance of the light channels and the property of the soil may be acquired by analyzing the light passing through the light channels, such that the complex operation of sampling analysis is eliminated, automatic processing is realized and the overall efficiency is improved.

As described in the steps S3-S5, the light emitting instruction is transmitted to the first rail vehicle terminal to make the first rail vehicle terminal control the preset light generation device on the first rail vehicle to transmit multiple beams of light to the second rail vehicle respectively through the plurality of light channels, and initial data when the multiple beams of light are emitted is recorded; the light receiving instruction is transmitted to the second rail vehicle terminal to make the second rail vehicle terminal control the preset light sensor on the second rail vehicle to acquire the multiple beams of light which are from the first rail vehicle and pass through the plurality of light channels respectively, and final data when the multiple beams of light are received is recorded; and the initial data when the multiple beams of light transmitted by the first rail vehicle terminal and the second rail vehicle terminal respectively are emitted, and the final data when the multiple beams of light are received are acquired. The light emitted by the preset light generation device on the first rail vehicle may be any feasible light, for example, may be visible or invisible light, but the light needs to be matched with the light channels, that is, the light channels are affected by the external environment to change the light transmittance. The light transmittance refers to the light emitted by the preset light generation device on the first rail vehicle, and correspondingly, the preset light sensor on the second rail vehicle senses the light. Therefore, a soil signal is converted into a light signal which is analyzed and calculated by the computer more easily. Therefore, the initial data when the multiple beams of light transmitted by the first rail vehicle terminal and the second rail vehicle terminal respectively are emitted, and the final data when the multiple beams of light are received are acquired to serve as the basis for analyzing the soil state, thus providing possibility for accurate prediction of the subsequent yield. An intensity of the light signal received by the second rail vehicle generally increases gradually because the distance between the two rails decreases as the driving time increases. Therefore, a length of the light channels decreases, the light is easier to pass, and the intensity of the received light signal is enhanced.

Further, a main body of each of the light channels is a glass pipe, the glass pipe being provided with a plurality of cavities and a plurality of capillary pores, the capillary pores being located between the cavities and soil, each of the cavities being filled with a solid PH value indicating material, and the solid PH value indicating material showing a first color in a preset acidic environment and showing other colors in other environments; and the step S3: a light emitting instruction is transmitted to the first rail vehicle terminal to make the first rail vehicle terminal control a preset light generation device on the first rail vehicle to transmit multiple beams of light to the second rail vehicle respectively through the plurality of light channels, and initial data when the multiple beams of light are emitted is recorded includes:

S301: a light emitting instruction is transmitted to the first rail vehicle terminal to make the first rail vehicle terminal control a preset light generation device on the first rail vehicle to transmit multiple beams of light to the second rail vehicle respectively through the plurality of light channels, and initial data when the multiple beams of light are emitted is recorded; and the step S4: a light receiving instruction is transmitted to the second rail vehicle terminal to make the second rail vehicle terminal control a preset light sensor on the second rail vehicle to acquire the multiple beams of light which are from the first rail vehicle and pass through the plurality of light channels respectively, and final data when the multiple beams of light are received is recorded includes:

S401: a light receiving instruction is transmitted to the second rail vehicle terminal to make the second rail vehicle terminal control a preset light sensor on the second rail vehicle to acquire the multiple beams of light which are from the first rail vehicle and pass through the plurality of light channels respectively, the light sensor being a sensor which is only able to sense visible light with the first color, and final data when the multiple beams of light are received is recorded.

It should be noted that in the present application, the solid PH value indicating material is taken as an example to show the influence on the light channels by the external environment, but other feasible materials are also applicable, for example, an indicating material for specified ion concentration in the soil may also be applicable. The solid PH value indicating material may be any feasible material, for example, a solid litmus which is red in an acidic environment (the degree is positively related with the acidity), so the material may transmit red visible light, and the visible light of the first color is red light at this time. Therefore, through the above design of the present application, when the soil is alkaline, the second rail vehicle cannot sense red light or only can sense very weak red light; and when the soil is acidic, intensities of the red light sensed by the second rail vehicle are different according to different acidities. In addition, the capillary pores refer to pores that communicate the cavity with the external soil, but do not allow the external soil to directly enter the cavity. The cavity and the external soil are interacted, for example, by making soil liquid in contact with the solid PH value indicating material in the cavity through the capillary pores.

As described in the step S6, the initial data when the ground image and the multiple beams of light are emitted, and the final data when the multiple beams of light are received are input into the preset crop yield prediction model for processing so as to acquire the predicted yield output by the crop yield prediction model, wherein the crop yield prediction model is trained by training data based on the neural network model, the training data being composed of a ground picture of the area with the known yield, light data emitted by the light generation device on the first rail vehicle in the area and light data received by the light sensor on the second rail vehicle in the area. Since the ground image, the initial data when the multiple beams of light are emitted and the final data when the multiple beams of light are received are respectively multi-level data of the ground surface level and the underground level, the multi-level data serves as data which is comprehensively input into the preset crop yield prediction model, such that the final yield prediction is more accurate.

Further, n rails are preset under the specified ground, the first rail is only provided with a No. 1 rail vehicle, all the rails except the first rail are provided with a No. 1 rail vehicle and a NO. 2 rail vehicle, the No. 1 rail vehicle being provided with a light generation device, and the No. 2 rail vehicle being provided with a light sensor; all the rail vehicles only can drive toward a first direction, and a connecting line of starting points of all the rail vehicles is vertical to the first direction; if the vehicles on the rails drive at the same speed, a distance of the vehicle on any one of the rails and the vehicle on another rail is inversely proportional to the driving time; all the rails are located at the same height position; a plurality of light channels are embedded between the adjacent rails, a light transmittance of the light channels is able to be affected by the external environment to change, n being an integer greater than 2; and the step S6: the initial data when the ground image and the multiple beams of light are emitted, and the final data when the multiple beams of light are received are input into a preset crop yield prediction model for processing so as to acquire a predicted yield output by the crop yield prediction model includes:

S611: an starting instruction is transmitted to terminals corresponding to all the rail vehicles to make all the rail vehicles drive along the corresponding rails and make the No. 1 rail vehicles emit multiple beams of light showing first color to the No. 2 rail vehicles on the next rail respectively through the plurality of light channels, such that the No. 2 rail vehicle are able to sense a signal through a light sensor, wherein parameters of light emitted by each of the No. 1 rail vehicles are unchanged, but parameters of light emitted by the No. 1 rail vehicles on different rails are different, S612: a vehicle stop instruction is transmitted to terminals corresponding to all the No. 2 rail vehicles to ask the No. 2 rail vehicles meeting a specified requirement to stop, wherein the specified requirement refers to that when the No. 2 rail vehicles detect that a signal intensity is greater than a preset intensity threshold, the No. 2 rail vehicles with the detected signal intensity greater than the preset intensity threshold meet the requirements, S613: locating positions of all the No. 2 rail vehicles are acquired when all the No. 2 rail vehicles stop so as to generate a site map according to the locating positions of all the No. 2 rail vehicles, and S614: the ground image and the site map are input into a preset crop yield prediction model for processing so as to acquire a predicted yield output by the crop yield prediction model.

Therefore, the soil signal is detected accurately in the way of n rails, and the soil signal is presented in the form of the site map, such that the subsequent crop yield prediction model can perform accurate prediction more easily. In the above solution, in particular, it should be noted that if the vehicles on the rails drive at the same speed, the distance between the vehicle on any one of the rails and the vehicle on the other rail is inversely proportional to the driving time; and parameters of the light emitted by each of the No. 1 rail vehicles are unchanged, but parameters of the light emitted by the No. 1 rail vehicles on different rails are different, which is the prerequisite for three-section conversion of soil signal-light signal-site map. if the vehicles on the rails drive at the same speed, the distance between the vehicle on any one of the rails and the vehicle on the other rail is inversely proportional to the driving time, indicating that the distance between the rails is getting narrower and narrower, which is a unified trend. The parameters of the light emitted by each of No. 1 rail vehicles are unchanged, but the parameters of the light emitted by the No. 1 rail vehicles on different rails are different, indicating that it is unnecessary for vehicles on the same rails to adjust the emitting parameters, but the light emitting parameters of the vehicles on different rails are different. In this way, the light transmittance of the light channel corresponding to one stopped No. 2 rail vehicle is just to allow the light emitted by the corresponding No. 1 rail vehicle to pass through and be sensed, so the stop position of the No. 2 rail vehicle is related to the light emitting parameter, the length of the light channel (that is, the distance between the rails) and the soil state. However, since the light emitting parameters of the vehicles on different rails are different, the site map formed by gathering the stop positions of the No. 2 rail vehicles on all the rails can accurately reflect the soil state. The special design of the site map generation is a major characteristic of the present application. Through the design, the accuracy is improved, and more importantly, it is possible to use a single convolutional neural network model for the crop yield prediction model, such that the calculation amount and the calculation pressure are reduced. Specifically, the crop yield prediction model is trained based on a single convolutional neural network model; and before the step S604: the ground image and the site map are input into a preset crop yield prediction model for processing so as to acquire a predicted yield output by the crop yield prediction model, the method includes:

S6031: a plurality of sample sets of a pre-collection set are acquired, wherein each of the sample sets is composed of a comprehensive image corresponding to a ground planted with crops and a yield label corresponding to the comprehensive image, and the comprehensive image is formed by splicing a ground image for training corresponding to the ground planted with the crops and a site map for training, S6032: the plurality of sample sets are divided into a training set and a verification set and a preset single convolutional neural network model is called, S6033: the training set is input into the convolutional neural network model for training so as to acquire an intermediate convolutional neural network model, S6034: the intermediate convolutional neural network model is verified by the verification set to acquire a verification result and judging whether the verification result is pass or fail, and S6035: if the verification result is pass, the intermediate convolutional neural network model is recorded as a crop yield prediction model.

Therefore, crop yield prediction is performed by the single convolutional neural network model. The comprehensive image, for example, is formed by splicing the ground image on the left and the site map on the right. Correspondingly, when the ground image and the site map image are input into the crop yield prediction model for processing, it is necessary to perform the same splicing processing.

According to the crop yield prediction method based on the multi-level variable analysis of the present application, an image acquisition instruction is transmitted to a preset aircraft terminal to acquire a ground image; a driving instruction is transmitted to a first rail vehicle terminal and a second rail vehicle terminal which are preset under the specified ground at the same time, wherein a distance between the first rail vehicle and the second rail vehicle is inversely proportional to the driving time, a plurality of light channels are embedded between a first rail and a second rail, and a light transmittance of the light channels is able to be affected by the external environment to change; a light emitting instruction is transmitted to the first rail vehicle terminal and initial data when multiple beams of light are emitted is recorded; and the ground image, the initial data when the multiple beams of light are emitted and the final data when the multiple beams of light are received are input into a preset crop yield prediction model for process so as to obtain a predicted yield output by the crop yield prediction model. In the present application, the multi-level at least includes an overground level and an underground level, which respectively correspond to the ground image acquired by the aircraft, the initial data when the multiple beams of light are emitted and the final data when the multiple beams of light are received, such that the crop yield prediction accuracy is improved. In particular, it should be noted that special design is adopted during data acquisition on the underground level, thereby reducing a hash rate consumed in the final data processing process and contributing to improving the overall prediction efficiency.

The embodiment of the present application provides a crop yield prediction device based on a multi-level variable analysis. The device, applied to a control terminal, includes:

an image acquisition instruction transmitting unit, configured to transmit an image acquisition instruction to a preset aircraft terminal to make the aircraft terminal control a preset image acquisition device on a preset aircraft to perform image acquisition processing on a specified ground to acquire a ground image, wherein crops are planted on the specified ground in advance;

a driving instruction transmitting unit, configured to transmit a driving instruction to a first rail vehicle terminal and a second rail vehicle terminal which are preset under the specified ground at the same time to make the first rail vehicle terminal control a first rail vehicle to move forward along a preset first rail and make the second rail vehicle terminal control a second rail vehicle to move forward along a preset second rail, wherein both the first rail vehicle and the second rail vehicle drive toward a first direction, a connecting line between a starting point of the first rail vehicle and a starting point of the second rail vehicle is vertical to the first direction, a distance between the first rail vehicle and the second rail vehicle is inversely proportional to the driving time, the first rail and the second rail are located in the same height position, a plurality of light channels are embedded between the first rail and the second rail, and a light transmittance of the light channels is able to be affected by the external environment to change;

a light emitting instruction transmitting unit, configured to transmit a light emitting instruction to the first rail vehicle terminal to make the first rail vehicle terminal control a preset light generation device on the first rail vehicle to transmit multiple beams of light to the second rail vehicle respectively through the plurality of light channels, and record initial data when the multiple beams of light are emitted;

a light receiving instruction transmitting unit, configured to transmit a light receiving instruction to the second rail vehicle terminal to make the second rail vehicle terminal control a preset light sensor on the second rail vehicle to acquire the multiple beams of light which are from the first rail vehicle and pass through the plurality of light channels respectively, and record final data when the multiple beams of light are received;

a light data acquisition unit, configured to acquire the initial data when the multiple beams of light transmitted by the first rail vehicle terminal and the second rail vehicle terminal respectively are emitted, and the final data when the multiple beams of light are received; and a predicted yield acquisition unit, configured to input the initial data when the ground image and the multiple beams of light are emitted, and the final data when the multiple beams of light are received into a preset crop yield prediction model for processing so as to acquire a predicted yield output by the crop yield prediction model, wherein the crop yield prediction model is trained by training data based on a neural network model, the training data being composed of a ground picture of an area with a known yield, light data emitted by the light generation device on the first rail vehicle in the area and light data received by the light sensor on the second rail vehicle in the area.

Operations performed by the above units respectively are in one-to-one correspondence with the crop yield prediction device based on the multi-level variable analysis in the above embodiments, which are not elaborated herein.

According to the crop yield prediction device based on the multi-level variable analysis of the present application, an image acquisition instruction is transmitted to a preset aircraft terminal to acquire a ground image; a driving instruction is transmitted to a first rail vehicle terminal and a second rail vehicle terminal which are preset under the specified ground at the same time, wherein a distance between the first rail vehicle and the second rail vehicle is inversely proportional to the driving time, a plurality of light channels are embedded between a first rail and a second rail, and a light transmittance of the light channels is able to be affected by the external environment to change; a light emitting instruction is transmitted to the first rail vehicle terminal and initial data when multiple beams of light are emitted is recorded; and the ground image, the initial data when the multiple beams of light are emitted and the final data when the multiple beams of light are received are input into a preset crop yield prediction model for process so as to obtain a predicted yield output by the crop yield prediction model. In the present application, the multi-level at least includes an overground level and an underground level, which respectively correspond to the ground image acquired by the aircraft, the initial data when the multiple beams of light are emitted and the final data when the multiple beams of light are received, such that the crop yield prediction accuracy is improved. In particular, it should be noted that special design is adopted during data acquisition on the underground level, thereby reducing a hash rate consumed in the final data processing process and contributing to improving the overall prediction efficiency.

Referring to FIG. 2, the embodiment of the disclosure further provides a computer device. The computer device may be a server, and an internal structure the computer device may be as shown in the figure. The computer device includes a processor, a memory, a network interface and a database which are connected through a system bus. The processor of the computer device is configured to provide computing and control capabilities. The memory of the computer device includes a nonvolatile storage medium and an internal memory. The nonvolatile storage medium stores an operating system, a computer program, and a database. The internal memory provides an environment for operations of the operating system and the computer program in the nonvolatile storage medium. The database of the computer device is configured to store the data used in the crop yield prediction method based on the multi-level variable analysis. The network interface of the computer device is configured to communicate with an external terminal through a network. The computer program is executed by the processor to implement the crop yield prediction method based on the multi-level variable analysis.

The processor performs the crop yield prediction method based on the multi-level variable analysis, the steps included in the method are respectively in one-to-one correspondence with the steps for performing the crop yield prediction method based on the multi-level variable analysis in the above embodiments, which are not elaborated herein.

Those skilled in the art may understand that the structure shown in the figure is only a block diagram of a part of the structure related to the solution of the disclosure and does not constitute a limitation to the computer device of the solution of the disclosure applied to the structure.

According to the computer device of the present application, an image acquisition instruction is transmitted to a preset aircraft terminal to acquire a ground image; a driving instruction is transmitted to a first rail vehicle terminal and a second rail vehicle terminal which are preset under the specified ground at the same time, wherein a distance between the first rail vehicle and the second rail vehicle is inversely proportional to the driving time, a plurality of light channels are embedded between a first rail and a second rail, and a light transmittance of the light channels is able to be affected by the external environment to change; a light emitting instruction is transmitted to the first rail vehicle terminal and initial data when multiple beams of light are emitted is recorded; and the ground image, the initial data when the multiple beams of light are emitted and the final data when the multiple beams of light are received are input into a preset crop yield prediction model for process so as to obtain a predicted yield output by the crop yield prediction model. In the present application, the multi-level at least includes an overground level and an underground level, which respectively correspond to the ground image acquired by the aircraft, the initial data when the multiple beams of light are emitted and the final data when the multiple beams of light are received, such that the crop yield prediction accuracy is improved. In particular, it should be noted that special design is adopted during data acquisition on the underground level, thereby reducing a hash rate consumed in the final data processing process and contributing to improving the overall prediction efficiency.

An embodiment of the present application further provides a computer readable storage medium, storing a computer program thereon. The computer program is executed by the processor to implement the crop yield prediction method based on the multi-level variable analysis. The steps included in the method are respectively in one-to-one correspondence with the steps for performing the crop yield prediction method based on the multi-level variable analysis in the above embodiments, which are not elaborated herein.

According to the computer readable storage medium of the present application, an image acquisition instruction is transmitted to a preset aircraft terminal to acquire a ground image; a driving instruction is transmitted to a first rail vehicle terminal and a second rail vehicle terminal which are preset under the specified ground at the same time, wherein a distance between the first rail vehicle and the second rail vehicle is inversely proportional to the driving time, a plurality of light channels are embedded between a first rail and a second rail, and a light transmittance of the light channels is able to be affected by the external environment to change; a light emitting instruction is transmitted to the first rail vehicle terminal and initial data when multiple beams of light are emitted is recorded; and the ground image, the initial data when the multiple beams of light are emitted and the final data when the multiple beams of light are received are input into a preset crop yield prediction model for process so as to obtain a predicted yield output by the crop yield prediction model. In the present application, the multi-level at least includes an overground level and an underground level, which respectively correspond to the ground image acquired by the aircraft, the initial data when the multiple beams of light are emitted and the final data when the multiple beams of light are received, such that the crop yield prediction accuracy is improved. In particular, it should be noted that special design is adopted during data acquisition on the underground level, thereby reducing a hash rate consumed in the final data processing process and contributing to improving the overall prediction efficiency.

Those of ordinary skill in the art can understand that all or some of processes for implementing the methods of the foregoing embodiments may be completed through a computer program or by instructing relevant hardware. The computer program may be stored in a nonvolatile computer readable storage medium. When the computer program is executed, processes of the embodiments of the foregoing methods may be included. For any reference used for a memory, a storage, a database, or other mediums used in the embodiments and provided by the disclosure may include a nonvolatile memory and/or a volatile memory. The nonvolatile memory may include a read-only memory (ROM), a programmable ROM (PROM), an electrical programmable ROM (EPROM), an electrical erasable programmable ROM (EEPROM) or a flash memory. The volatile memory may include a random access memory (RAM) or an external cache memory. As illustration rather than limitation, RAM may be obtained in various forms, for example, a static RAM (SRAM), a dynamic RAM (DRAM), a synchronous DRAM (SDRAM), a double data rate SDRAM (SSRSDRAM), an enhanced SDRAM (ESDRAM), a synchronous link (Synchlink) DRAM (SLDRAM), a memory bus (Rambus) direct RAM (RDRAM), a direct memory bus dynamic RAM (DRDRAM), a memory bus dynamic RAM (RDRAM), etc.

It should be noted that in the specification, the terms "include", "comprise" or any other variants thereof are intended to cover non-exclusive inclusion, such that a process, device, article or method including a series of elements not only includes those elements, but also includes other elements not explicitly listed, or further includes elements inherent to the process, device, article or method. In the absence of more restrictions, the element defined by the sentence "including a . . . " does not exclude the presence of other identical elements in the process, device, article or method including the element.

The above are only the preferred embodiments of the disclosure and do not limit the patent scope of the disclosure. Any equivalent structure or equivalent process transformation made by the contents of the specification and the drawings of the disclosure, or directly or indirectly applied to other related technical fields, are equally included in the patent protection scope of the disclosure.

What is claimed:

1. A crop yield prediction method based on a multi-level variable analysis, applied to a control terminal, the method comprising:
   S1: transmitting an image acquisition instruction to a preset aircraft terminal to make the aircraft terminal control a preset image acquisition device on a preset aircraft to perform image acquisition processing on a specified ground to acquire a ground image, wherein crops are planted on the specified ground in advance;
   S2: transmitting a driving instruction to a first rail vehicle terminal and a second rail vehicle terminal which are preset under the specified ground at the same time to make the first rail vehicle terminal control a first rail vehicle to move forward along a preset first rail and make the second rail vehicle terminal control a second rail vehicle to move forward along a preset second rail, wherein both the first rail vehicle and the second rail vehicle drive toward a first direction, a connecting line between a starting point of the first rail vehicle and a starting point of the second rail vehicle is vertical to the first direction, a distance between the first rail vehicle and the second rail vehicle is inversely proportional to the driving time, the first rail and the second rail are located in the same height position, a plurality of light channels are embedded between the first rail and the second rail, and a light transmittance of the light channels is able to be affected by the external environment to change;
   S3: transmitting a light emitting instruction to the first rail vehicle terminal to make the first rail vehicle terminal control a preset light generation device on the first rail vehicle to transmit multiple beams of light to the second rail vehicle respectively through the plurality of light channels, and recording initial data when the multiple beams of light are emitted;
   S4: transmitting a light receiving instruction to the second rail vehicle terminal to make the second rail vehicle terminal control a preset light sensor on the second rail vehicle to acquire the multiple beams of light which are from the first rail vehicle and pass through the plurality of light channels respectively, and recording final data when the multiple beams of light are received;
   S5: acquiring the initial data when the multiple beams of light transmitted by the first rail vehicle terminal and the second rail vehicle terminal respectively are emitted, and the final data when the multiple beams of light are received; and S6: inputting the initial data when the ground image and the multiple beams of light are emitted, and the final data when the multiple beams of light are received into a preset crop yield prediction model for processing so as to acquire a predicted yield output by the crop yield prediction model, wherein the crop yield prediction model is trained by training data based on a neural network model, the training data being composed of a ground picture of an area with a known yield, light data emitted by the light generation device on the first rail vehicle in the area and light data received by the light sensor on the second rail vehicle in the area.

2. The crop yield prediction method based on the multi-level variable analysis according to claim 1, wherein the aircraft is an unmanned aerial vehicle and a satellite; the step S1: transmitting an image acquisition instruction to a preset aircraft terminal to make the aircraft terminal control a preset image acquisition device on a preset aircraft to perform image acquisition processing on a specified ground to acquire a ground image comprises:

S101: transmitting a first image acquisition instruction to an unmanned aerial vehicle terminal to make the unmanned aerial vehicle terminal control a preset image acquisition device on an unmanned aerial vehicle to perform image acquisition processing on a specified ground to acquire a first ground image, and S102: transmitting an image acquisition instruction to a satellite terminal to make the satellite terminal control a preset image acquisition device on the satellite to perform image acquisition processing on a specified ground to acquire a second ground image;

the crop yield prediction model is composed of a first neural network architecture, a second neural network architecture and a third neural network architecture, the first neural network architecture being connected to the second neural network architecture in parallel, and the first neural network architecture and the second neural network architecture being respectively connected to the third neural network architecture in series; the first neural network architecture is composed of a first convolutional neural network structure, a second convolutional neural network structure and a BP neural network structure, the first convolutional neural network structure being connected to the second convolutional neural network structure in parallel, and the first convolutional neural network structure and the second convolutional neural network structure being respectively connected to the BP neural network structure in series; and the step S6: inputting the initial data when the ground image and the multiple beams of light are emitted, and the final data when the multiple beams of light are received into a preset crop yield prediction model for processing so as to acquire a predicted yield output by the crop yield prediction model comprises:

S601: inputting the first ground image into the first convolutional neural network structure so as to utilize a convolutional layer, a pooling layer and a full connection layer in the first convolutional neural network structure to process the first ground image into a first one-dimensional feature vector, S602: inputting the second ground image into the second convolutional neural network structure so as to utilize a convolutional layer, a pooling layer and a full connection layer in the second convolutional neural network structure to process the second ground image into a second one-dimensional feature vector, S603: generating a two-dimensional relation matrix according to the first one-dimensional feature vector and the second one-dimensional feature vector, S604: performing matrix dimension transformation and feature screening processing on the two-dimensional relation matrix and inputting into the BP neural network structure so as to acquire a first prediction yield output by the BP neural network structure, S605: inputting the initial data when the multiple beams of light are emitted, and the final data when the multiple beams of light are received into the second neural network architecture so as to acquire a second prediction yield output by the second neural network architecture, and S606: inputting the first prediction yield and the second prediction yield into the third neural network architecture so as to acquire a final prediction yield output by the third neural network architecture according to weight allocation.

3. The crop yield prediction method based on the multi-level variable analysis according to claim 1, wherein a main body of each of the light channels is a glass pipe, the glass pipe being provided with a plurality of cavities and a plurality of capillary pores, the capillary pores being located between the cavities and soil, each of the cavities being filled with a solid PH value indicating material, and the solid PH value indicating material showing a first color in a preset acidic environment and showing other colors in other environments; and the step S3: transmitting a light emitting instruction to the first rail vehicle terminal to make the first rail vehicle terminal control a preset light generation device on the first rail vehicle to transmit multiple beams of light to the second rail vehicle respectively through the plurality of light channels, and recording initial data when the multiple beams of light are emitted comprises:

S301: transmitting a light emitting instruction to the first rail vehicle terminal to make the first rail vehicle terminal control a preset light generation device on the first rail vehicle to transmit multiple beams of light to the second rail vehicle respectively through the plurality of light channels, and recording initial data when the multiple beams of light are emitted; and the step S4: transmitting a light receiving instruction to the second rail vehicle terminal to make the second rail vehicle terminal control a preset light sensor on the second rail vehicle to acquire the multiple beams of light which are from the first rail vehicle and pass through the plurality of light channels respectively, and recording final data when the multiple beams of light are received comprises:

S401: transmitting a light receiving instruction to the second rail vehicle terminal to make the second rail vehicle terminal control a preset light sensor on the second rail vehicle to acquire the multiple beams of light which are from the first rail vehicle and pass through the plurality of light channels respectively, the light sensor being a sensor which is only able to sense visible light with the first color, and recording final data when the multiple beams of light are received.

4. The crop yield prediction method based on the multi-level variable analysis according to claim 3, wherein n rails are preset under the specified ground, the first rail is only provided with a No. 1 rail vehicle, all the rails except the first rail are provided with a No. 1 rail vehicle and a NO. 2 rail vehicle, the No. 1 rail vehicle being provided with a light generation device, and the No. 2 rail vehicle being provided with a light sensor; all the rail vehicles only can drive toward a first direction, and a connecting line of starting points of all the rail vehicles is vertical to the first direction; if the vehicles on the rails drive at the same speed, a distance of the vehicle on any one of the rails and the vehicle on the other rail is inversely proportional to the driving time; all the rails are located at the same height position; a plurality of light channels are embedded between the adjacent rails, a light transmittance of the light channels is able to be affected by the external environment to change, n being an integer greater than 2; and the step S6: inputting the initial data when the ground image and the multiple beams of light are emitted, and the final data when the multiple beams of light are received into a preset crop yield prediction model for processing so as to acquire a predicted yield output by the crop yield prediction model comprises:

S611: transmitting an starting instruction to terminals corresponding to all the rail vehicles to make all the rail vehicles drive along the corresponding rails and make the No. 1 rail vehicles emit multiple beams of light showing first color to the No. 2 rail vehicles on the next rail respectively through the plurality of light channels, such that the No. 2 rail vehicle are able to sense a signal through a light sensor, wherein parameters of light emitted by each of the No. 1 rail vehicles are unchanged, but parameters of light emitted by the No. 1 rail vehicles on different rails are different, S612: transmitting a vehicle stop instruction to terminals corresponding to all the No. 2 rail vehicles to ask the No. 2 rail vehicles meeting a specified requirement to stop, wherein the specified requirement refers to that when the No. 2 rail vehicles detect that a signal intensity is greater than a preset intensity threshold, the No. 2 rail vehicles with the detected signal intensity greater than the preset intensity threshold meet the requirements, S613: acquiring locating positions of all the No. 2 rail vehicles when all the No. 2 rail vehicles stop so as to generate a site map according to the locating positions of all the No. 2 rail vehicles, and S614: inputting the ground image and the site map into a preset crop yield prediction model for processing so as to acquire a predicted yield output by the crop yield prediction model.

5. The crop yield prediction method based on the multi-level variable analysis according to claim 4, wherein the crop yield prediction model is trained based on a single convolutional neural network model; and before the step S604: inputting the ground image and the site map into a preset crop yield prediction model for processing so as to acquire a predicted yield output by the crop yield prediction model, the method comprises:

S6031: acquiring a plurality of sample sets of a pre-collection set, wherein each of the sample sets is composed of a comprehensive image corresponding to a ground planted with crops and a yield label corresponding to the comprehensive image, and the comprehensive image is formed by splicing a ground image for training corresponding to the ground planted with the crops and a site map for training, S6032: dividing the plurality of sample sets into a training set and a verification set and calling a preset single convolutional neural network model, S6033: inputting the training set into the convolutional neural network model for training so as to acquire an intermediate convolutional neural network model, S6034: verifying the intermediate convolutional neural network model by the verification set to acquire a verification result and judging whether the verification result is pass or fail, and S6035: if the verification result is pass, recording the intermediate convolutional neural network model as a crop yield prediction model.

6. A crop yield prediction device based on a multi-level variable analysis, applied to a control terminal, the device comprising:

an image acquisition instruction transmitting processor, configured to transmit an image acquisition instruction to a preset aircraft terminal to make the aircraft terminal control a preset image acquisition device on a preset aircraft to perform image acquisition processing on a specified ground to acquire a ground image, wherein crops are planted on the specified ground in advance;

a driving instruction transmitting processor, configured to transmit a driving instruction to a first rail vehicle terminal and a second rail vehicle terminal which are preset under the specified ground at the same time to make the first rail vehicle terminal control a first rail vehicle to move forward along a preset first rail and make the second rail vehicle terminal control a second rail vehicle to move forward along a preset second rail, wherein both the first rail vehicle and the second rail vehicle drive toward a first direction, a connecting line between a starting point of the first rail vehicle and a starting point of the second rail vehicle is vertical to the first direction, a distance between the first rail vehicle and the second rail vehicle is inversely proportional to the driving time, the first rail and the second rail are located in the same height position, a plurality of light channels are embedded between the first rail and the second rail, and a light transmittance of the light channels is able to be affected by the external environment to change;

a light emitting instruction transmitting processor, configured to transmit a light emitting instruction to the first rail vehicle terminal to make the first rail vehicle terminal control a preset light generation device on the first rail vehicle to transmit multiple beams of light to the second rail vehicle respectively through the plurality of light channels, and record initial data when the multiple beams of light are emitted;

a light receiving instruction transmitting processor, configured to transmit a light receiving instruction to the second rail vehicle terminal to make the second rail vehicle terminal control a preset light sensor on the second rail vehicle to acquire the multiple beams of light which are from the first rail vehicle and pass through the plurality of light channels respectively, and record final data when the multiple beams of light are received;

a light data acquisition processor, configured to acquire the initial data when the multiple beams of light transmitted by the first rail vehicle terminal and the second rail vehicle terminal respectively are emitted, and the final data when the multiple beams of light are received; and a predicted yield acquisition processor, configured to input the initial data when the ground image and the multiple beams of light are emitted, and the final data when the multiple beams of light are received into a preset crop yield prediction model for processing so as to acquire a predicted yield output by the crop yield prediction model, wherein the crop yield prediction model is trained by training data based on a neural network model, the training data being composed of a ground picture of an area with a known yield, light data emitted by the light generation device on the first rail vehicle in the area and light data received by the light sensor on the second rail vehicle in the area.

\* \* \* \* \*